Dec. 18, 1923.  
F. NAROBE  
BAKING MACHINE  
Filed July 8, 1921  
1,477,842  
5 Sheets-Sheet 1

FRANK NAROBE  
Inventor  
By his Attorney Julian J. Witta

Dec. 18, 1923. 1,477,842
F. NAROBE
BAKING MACHINE
Filed July 8, 1921   5 Sheets-Sheet 2
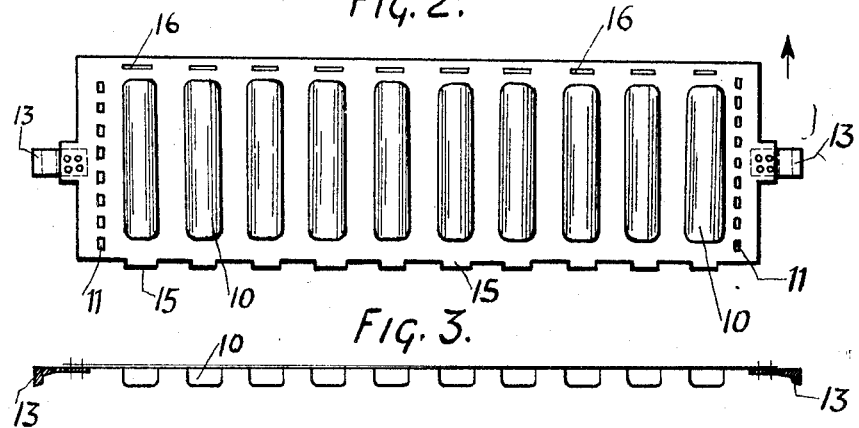
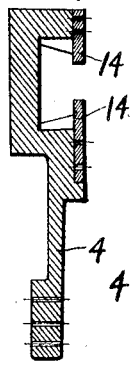
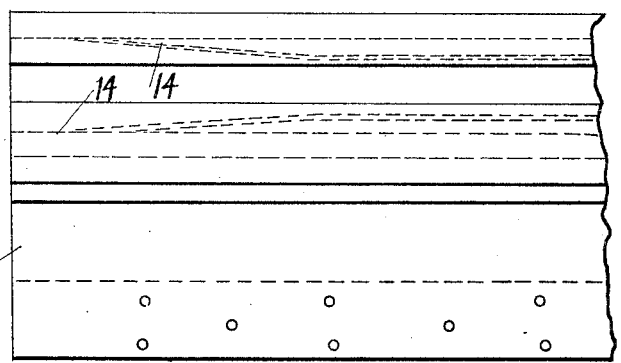
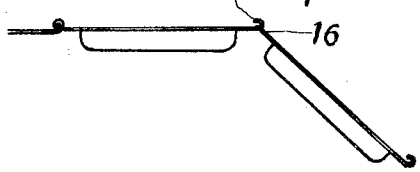
FRANK NAROBE
INVENTOR
BY his ATTORNEY Dec. 18, 1923.  1,477,842
F. NAROBE
BAKING MACHINE
Filed July 8, 1921   5 Sheets-Sheet 3
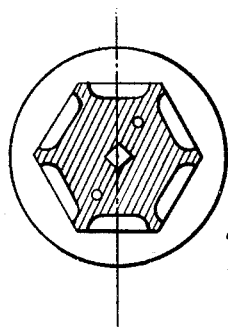
FIG. 8.
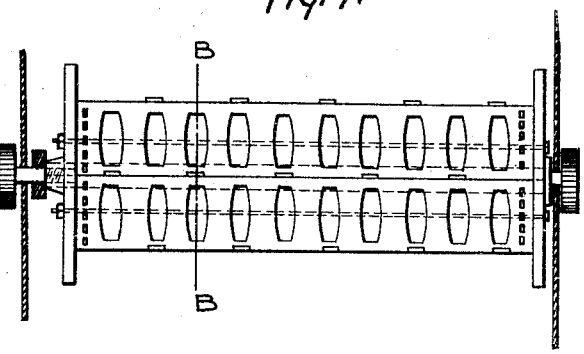
FIG. 7.
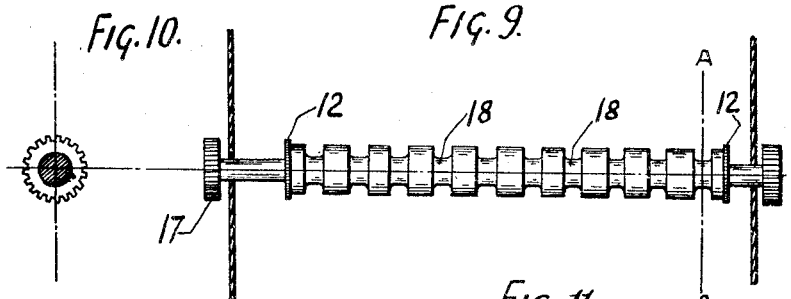
FIG. 10.   FIG. 9.
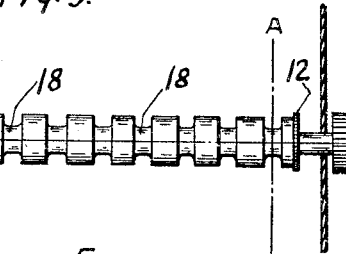
FIG. 12.   FIG. 11.
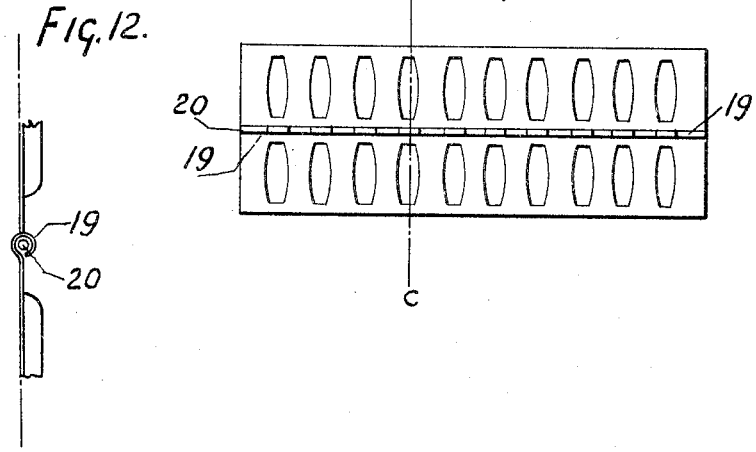
FRANK NAROBE
Inventor
By his Attorney Julian J. Wittel

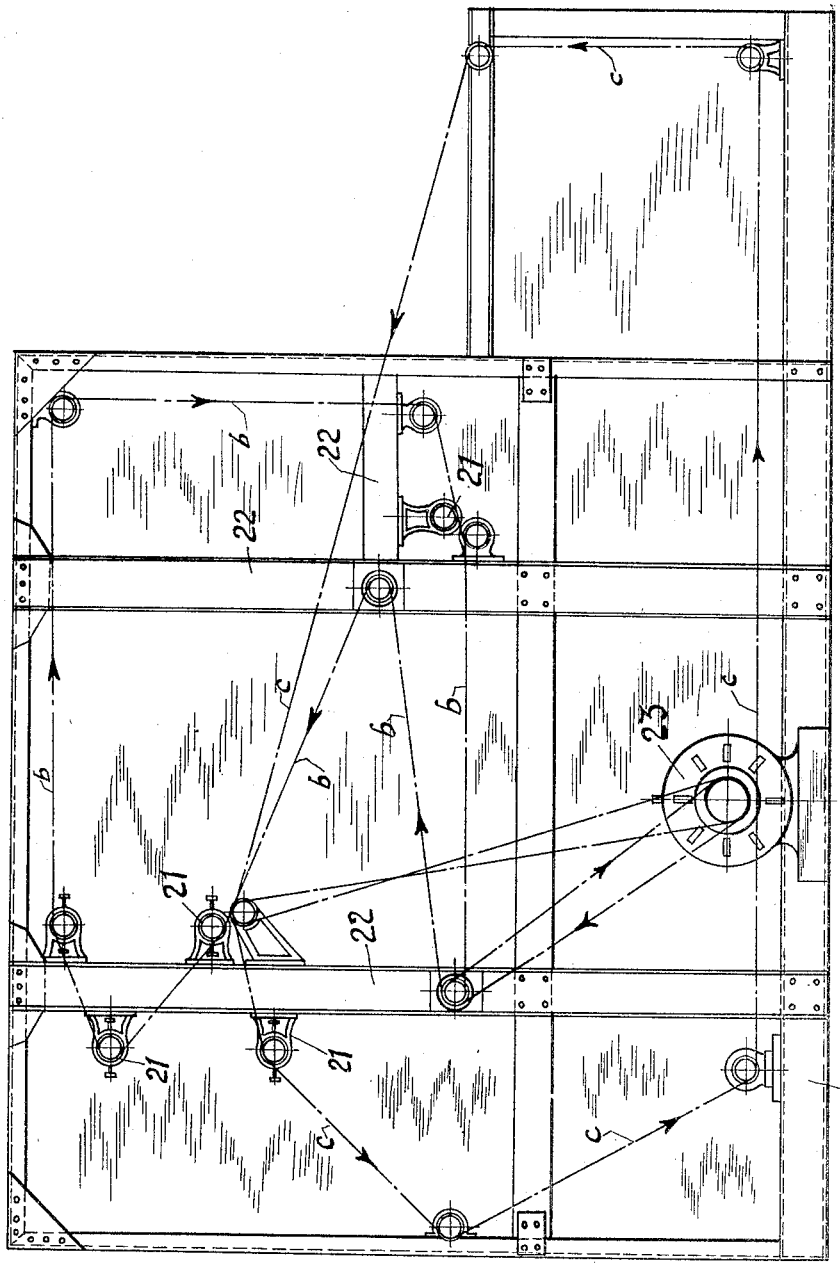

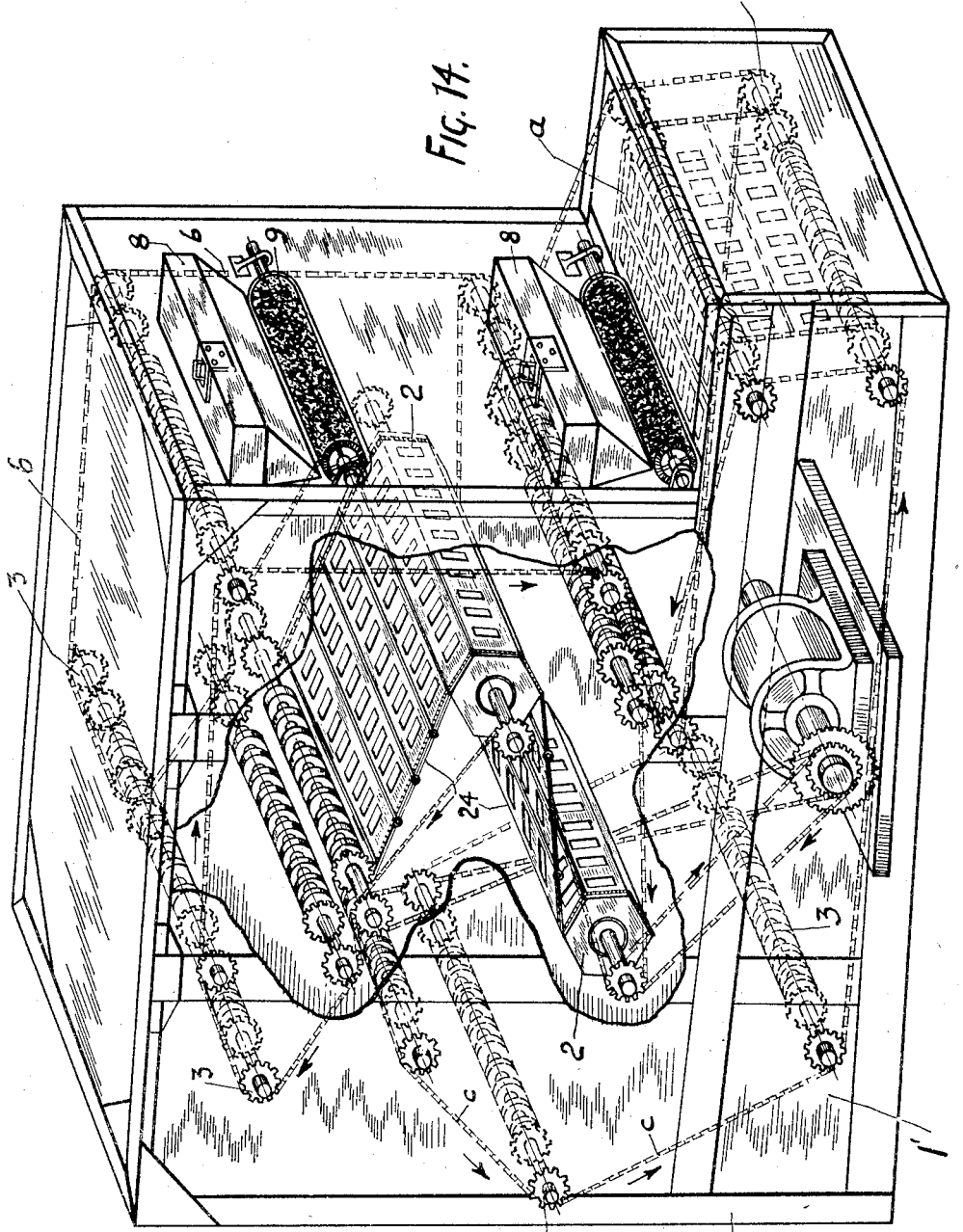

Patented Dec. 18, 1923.

1,477,842

UNITED STATES PATENT OFFICE.

FRANK NAROBE, OF NEW YORK, N. Y.

BAKING MACHINE.

Application filed July 8, 1921. Serial No. 483,242.

*To all whom it may concern:*

Be it known that I, FRANK NAROBE, a citizen of Yugoslavia, and resident of New York, in the county of New York and State of New York, have invented certain new and useful Improvements in Baking Machines, of which the following is a specification.

This invention relates to an automatic oven for baking rolls and the object thereof is to provide a compact and efficient structure in which rolls can be baked to the desired degree automatically after the dough has been deposited within the oven.

A further object of the invention is to effect the formation of the rolls automatically and in a certain and exact manner, the shape thereof being varied as desired.

A still further object of the invention is to provide means for greasing or otherwise treating the forms which form and carry the rolls through the oven so that the rolls will not adhere thereto.

With the foregoing objects in view and others, the invention resides in the novel combination, and in the arrangement and details of construction hereinafter described, defined in the claims, and illustrated in the accompanying drawings forming a material part of this specification.

In the accompanying drawings:

Figures 2 and 3 are respectively top and front views of a baking chain element as used in my machine.

Figures 4 and 5 are front and sectional side views of initial guide rails as used in connection with said chain elements.

Figure 6 is a side view of several chain elements showing the method of flexibly connecting them to each other.

Figure 7 is a front view of a polygonal guide and propelling drum for said chain elements.

Figure 8 is a sectional view taken at the line B—B of Figure 7.

Figures 9 and 10 are similar views of a round propelling and guiding shaft as used on my baking machine, the sectional view being taken on the line A—A of Figure 9.

Figure 11 is a top view showing the connection of the last two elements in my baking chains and Figure 12 is a sectional view of said connection taken on the line C—C of Figure 11.

Figure 13 is a side elevational view of my assembled baking machine, partly diagrammatic and showing one method of driving the mechanism of same, and Figure 14 is a perspective view of my baking machine, parts being broken away and other parts of same shown in phantomic view.

Similar characters refer to similar parts throughout the several figures of the drawings.

Figure 1:
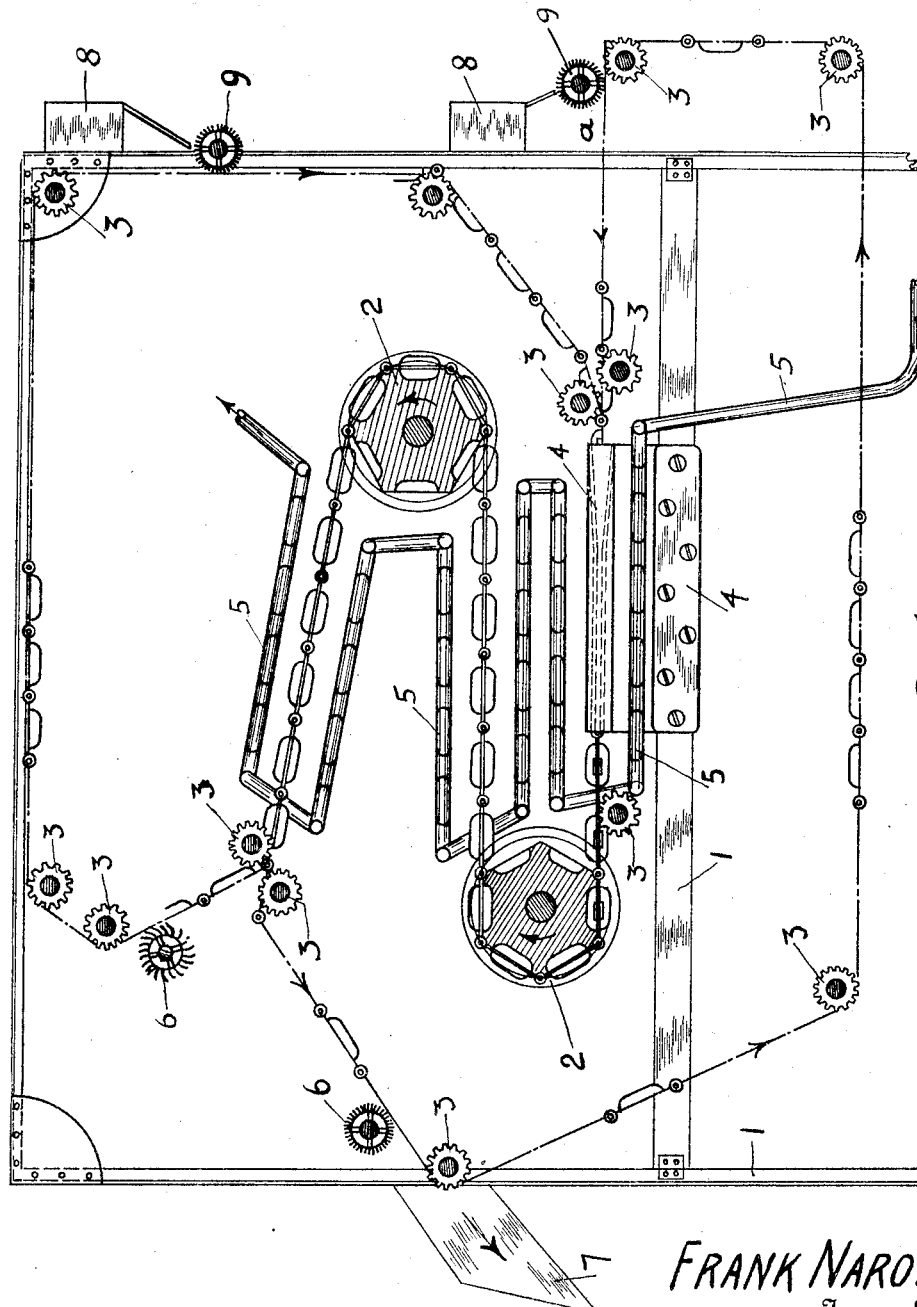
Figure 1 is a longitudinal sectional partly diagrammatic side view of my baking oven or machine.

Referring more particularly to the drawings, the numeral 1 in Figure 1 indicates any suitable steel or other structure supporting the different parts of my baking machine and carrying the sheet metal outside cover of the same. In this structure are carried, rotatable in suitable bearings or journal boxes, polygonal drums 2 made of iron, wood or other material and having such contours and forms that the elements of the baking chains will fit into them and will be carried or dragged by them. Said drums also contribute to the exact co-operation of the two baking chains as will be explained later on as this specification proceeds. As additional driving and guiding mechanisms I employ shafts 3, 3. Driven by suitable means as will be hereinafter detailed these drums 2, 2 and shafts 3, 3 pull and guide two baking chains. The lower baking chain enters the machine at the place marked by the letter *a*, follows the way shown by the arrows through the machine and around the polygonal drums and guiding shafts, then turns downwardly and returns to its starting point in front of the machine as an endless chain. The upper chain as shown in this embodiment of my invention remains all the time within the machine, that is, within the structural frame and sheet metal covering of same, follows first the same road as the lower one, with which its elements co-operate, but turns then upwards and making its round, returns to the spot where it meets again the lower co-acting chain.

In the operation of my machine the batter or dough is placed in measured and weighed pieces in suitable forms pressed into the lower chain in front of the machine at or around the place marked by the letter *a*. For this purpose the lower chain may extend some distance in front of the machine and also to keep the man working there out of the range of the heat of the oven. Two shafts 3, 3 guide and propel the lower and upper chains nearer together after the roll material has been put on the lower one. For the purpose that the elements of the two baking chains should work in exact relation with each other and that the material should be slowly and gradually spread and formed and the co-acting molds of the two chain elements filled with said material, I employ a pair of guide rails 4, 4 the preferred construction of which will be described in detail later on and which will lead the two elements of the chains gradually together and force them in the desired exact relation. Leaving these guide rails the chains are kept in exact co-operation by the guide and propelling drums and shafts so that no appreciable relative movements can take place between them thereby insuring the exact and faultless shape of the rolls produced.

Held between the two forms the rolls are baked evenly from both sides by steam coils 5, 5 or by any other suitable heating means. These heating means and the speed of the chains can be regulated by any of the usual methods in actual practice so that the rolls produced will be as desired. After separation of the two chains the rolls are swept off the chains by rotary brushes 6, 6, as they may stick to the forms and are removed through the spout 7 into any holding device or container and moved further according to necessity. I also employ containers 8, 8 for fat or butter which in co-operation with cylindrical rotary brushes 9, 9 grease the chain elements before entering the machine and before depositing the roll material on them. This facilitates their removal later on and insures more perfect baking and appearance of the product.

In Figures 2 and 3 I show one of the chain elements of my baking machine. It is preferably made of pressed sheet metal, is of rectangular shape and moves in the machine in the direction of the arrow in Figure 2. Any suitable and usual forms of rolls can be pressed into it as 10, 10 and if any other form of rolls are to be baked with my machine the chain elements and guiding and propelling drums and shafts can be easily exchanged and replaced by the ones containing the desired shape and size of molds. On the two sides of said chain elements are continuous rows of holes 11 which co-operate with sprocket wheels 12 on the propelling shafts (Figure 9). Further on the sides of said chain elements are guide castings 13 screwed, or fastened to said chain elements by some other means. These guide castings co-operate with the guide device 4 shown at Figures 4 and 5 which is screwed or fastened by any other way in the path of the two baking chains as has been explained before and shown at Figure 1. Said guide device has guide rails 14 which receive the castings 13 at a distance from each other and in their path force them and the chain elements gradually into the desired relation and distance or closeness to each other.

The chain elements also have co-operating linking devices preferably hooks 15 and openings 16 (Figures 2 and 6) which enable them to be in reliable connection and at the same time flexible enough to follow almost any path prescribed in the machine for the baking chains.

The construction of the drums is shown in Figures 7 and 8. They are polygonal, preferably hexagonal and their size and shape corresponds to that of the chain elements used for the kind of roll which it is desired to produce. They are driven from the outside of the machine cover by a chain and sprocket wheels 17 or by any other suitable method. This preferred construction of said drums also assists in forcing the two chain elements together, prevents their longitudinal relative motion and by applying any suitable means to keep the distance of the two drums at the two ends of my machine the utmost permitted by the chains, said chains can be kept in a tight condition without any sagging and thereby also helping their exact meeting each other and faultless co-operation of their molds.

Somewhat similar purposes are served by the propelling and guiding shafts which are employed in the number and position as necessary and the detailed construction of which is shown at Figures 9 and 10. They are mainly to move said chain elements and to insure their absolute exact co-operation since the teeth of the same shaft wheels 12 are propelling both chains and catching the co-acting pairs in the rows of holes 11 in both chains. Through forms 18 they also prevent any horizontal relative motion of the chain elements. In order to facilitate the exchange of any form of chains to another one and make it possible to close a chain of baking elements I employ at the final pair of elements in my chains the connecting device shown at Figures 11 and 12. Both chain plates have similar alternative hinge elements 19 which are set into the right position and a rod 20 pushed through them.

In Figure 13 the drive of the different shafts and drums is shown. They are mounted in bearing elements 21 carried by strong structural members 22. Motion of the lower chain is produced by the driving chain $c$—$c$—$c$ and of the upper chain by driving chain $b$—$b$—$b$. Both driving chains receive their power and motion from any suitable source; as shown by an electric motor 23. The source of the power and speed may be directly regulated or may have gearing or other methods to obtain the desired speed.

To obtain a more thorough understanding of my baking machine, I also show a perspective view of same fully assembled as in Figure 14. Parts of my baking machine have been removed or broken away to give a clearer drawing and parts have been shown in a phantomic view through the sheet metal covering. The place where the material is placed on my lower baking chain by hand or by any other method is marked by the letter $a$. 1 is the structural steel frame, 1' the sheet metal covering of the oven, 8 the fat or butter containers, 9 the rotary brush cylinders for said grease material, 2 the polygonal drums, 3 the different guiding and propelling shafts, $b$—$b$ and $c$—$c$ the driving chains for the lower and upper baking elements respectively and 24 the co-acting baking plates.

By the means hereinbefore described, there is provided a compact and efficient roll baking oven or machine, the advantages of which will be readily apparent to those skilled in the art to which the invention relates. This machine, owing to its construction and operation, can be employed to automatically carry out the baking of rolls in an automatic manner, will form the dough introduced thereinto to the desired shape, and discharge the rolls into a hopper or other receptacle after the baking operation.

What I claim and desire to secure by Letters Patent is:

1. A roll baking machine comprising a casing, a pair of co-operating chains within said casing, spaced apart co-operating roll-forming molds, carried by said chains, said chains having baking elements of sheet metal carrying said roll-forming molds pressed therein, and being hingedly connected to one another; polygonal drums within said casing, having recesses to receive said molds, said drums co-operating with said two chains, securing their longitudinal relation to one another and their movement in said direction; cylindrical drums within said casing having rings cut therein and co-operating with said molds, pressed in the said chain elements, securing a transversal relative position of the elements of said two chains to each other; rows of perforations in said chain elements, gears on said cylindrical drums, co-operating with said rows of perforations and further insuring the longitudinal motion and relative position of the elements of said two chains; guide pieces applied to said chain elements; two pairs of guide rails applied to said casing and apapted to co-operate with said guide pieces thereby causing the co-operating pairs of the chain elements to gradually close on one another; means to drive said polygonal and cylindrical drums, and means to adjustably apply heat to said two baking chains, said chains being led through said casing in several parallel courses in front of said heating means.

2. In a roll baking machine of the class described, two co-operating chains of baking elements, said baking elements being made of sheet metal, having roll-forming molds pressed therein and being hingedly connected in continuous pairs by means of corresponding perforations and hooks formed integrally at the respective edges of the co-operating chain elements, said chain elements having longitudinal rows of perforations and being adapted to be propelled thereby.

3. In a roll baking machine of the class described, two co-operating chains of baking elements, said baking elements being made of sheet metal, having roll-forming molds pressed therein, and being hingedly connected in continuous pairs by means of corresponding perforations and hooks formed integrally at the respective edges of the co-operating chain elements, said chain elements having longitudinal rows of perforations and being adapted to be propelled thereby; guide pieces secured to said chain elements; two pairs of guide rails applied to said baking machine and adapted to force said two chains of baking elements into closed and co-operating position; polygonal drums applied to said baking machine and having sides to correspond to said baking elements and recesses in said sides adapted to receive said roll-forming molds; cylindrical drums applied to said baking machine and having ring-formed recesses cut therein and adapted to receive said roll-forming molds; said cylindrical drums having gears applied thereon co-operating with said rows of perforations in said baking elements.

Signed at New York, in the county of New York and State of New York this 11th day of June A. D. 1921.

FRANK NAROBE.